Dec. 15, 1964 G. L. DE WOLF ETAL 3,161,813
MAGNETIC OSCILLATOR CONTROLLED MOTOR
Filed July 30, 1962 3 Sheets-Sheet 1

Inventors:
George L. de Wolf,
Reade Williams.
by Zenard J Platt
Their Attorney

Dec. 15, 1964 G. L. DE WOLF ETAL 3,161,813
MAGNETIC OSCILLATOR CONTROLLED MOTOR
Filed July 30, 1962 3 Sheets-Sheet 2

Inventors:
George L. de Wolf,
Reade Williams.
by Zenad J Platt
Their Attorney

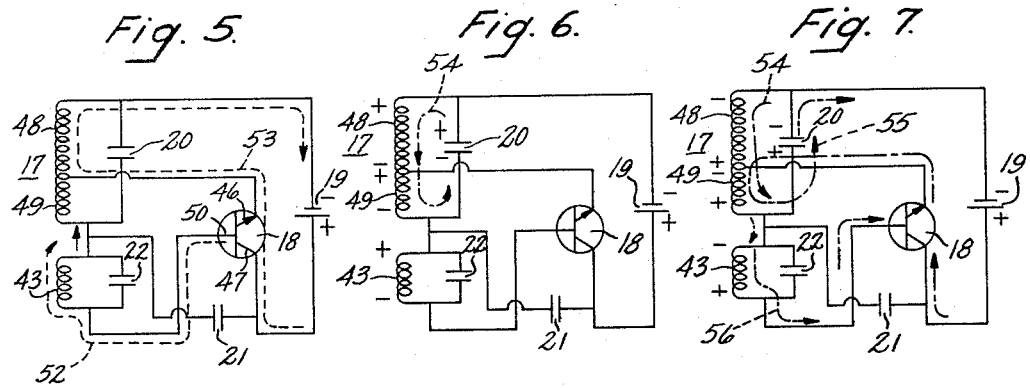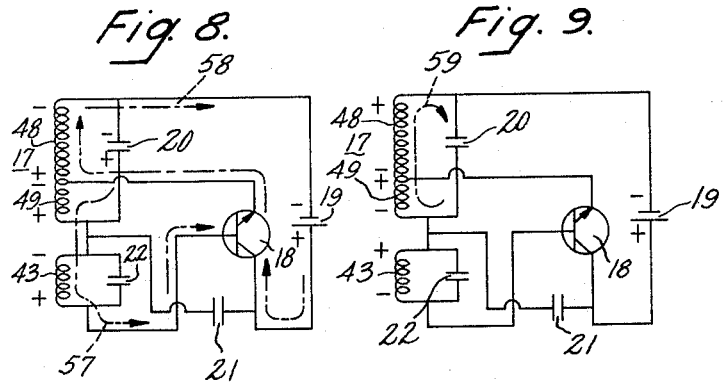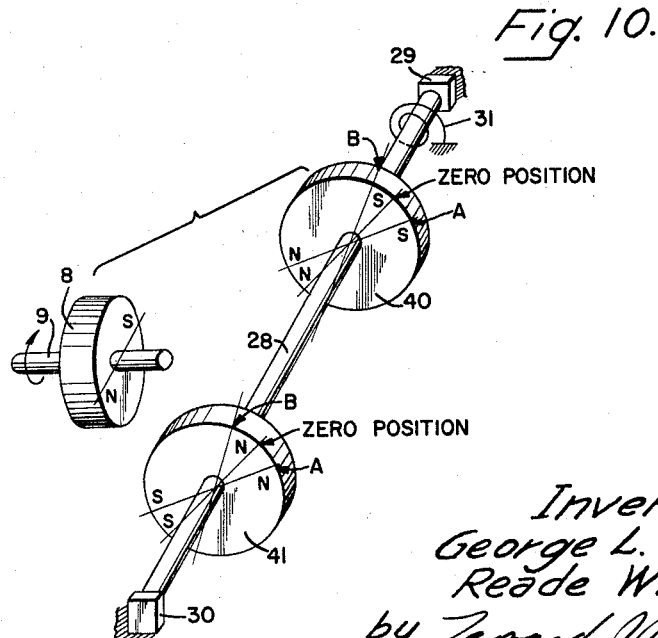

United States Patent Office 3,161,813
Patented Dec. 15, 1964

3,161,813
MAGNETIC OSCILLATOR CONTROLLED MOTOR
George L. de Wolf, Ithaca, N.Y., and Reade Williams, Pittsburgh, Pa., assignors to General Electric Company, a corporation of New York
Filed July 30, 1962, Ser. No. 213,341
10 Claims. (Cl. 318—138)

This invention relates to a clock, and more specifically, to a battery powered permanent magnet motor for a clock having a rate of rotation controlled by a mechanical magnetic oscillator.

A synchronous motor connected to a conventional alternating current power outlet provides an accurately timed readily manufactured motor which may be conveniently used for driving clock or timer mechanisms. However, clocks driven by batteries or other direct current sources frequently require escapement mechanisms having a relatively great number of parts for rotating the clock mechanism at the desired speed. A relatively simple and compact device which may utilize battery power for rotating a clock mechanism at a controlled rate and which does not require an escapement mechanism is especially desirable.

Accordingly, it is the primary object of this invention to provide an improved rotatable motor which is arranged to be synchronized and driven at a horological rate by a unique D.-C. powered oscillator.

It is a further object of the invention to provide a battery powered clock motor which is rotated at a speed determined by a permanent magnet positioned on a mechanical oscillator.

In accord with one aspect of this invention, there is provided a battery powered clock motor whose rate of rotation is determined by an electronic oscillator synchronized with a mechanical magnetic oscillator. The electronic oscillator is connected to the motor and the battery and further includes a pickup coil. The mechanical oscillator has a permanent magnet mounted thereon and positioned in inductive relation with the pickup coil. The mechanical oscillator has a relatively accurate natural frequency of oscillation which is close to the frequency of oscillation of the electronic oscillator. When the mechanical oscillator is actuated its permanent magnet induces signals in the pickup coil to cause the electronic oscillator to oscillate with the frequency of the mechanical oscillator. Since the mechanical oscillator provides a relatively accurate frequency output, the clock is rotated at an accurate rate.

Further features, objects and attendant advantages will become apparent with reference to the following drawings in which:

FIGS. 5–9 are circuit diagrams showing the step-by-step operation of the electronic oscillator.

FIGURE 10 shows the relative positioning of the motor rotor and the mechanical oscillator.

Figure 1:
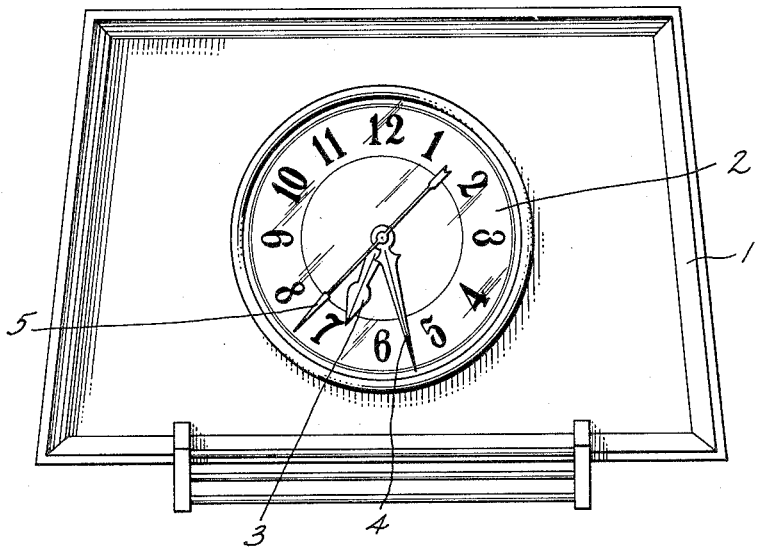
FIG. 1 is a front elevation view of a clock incorporating the invention.

Referring to FIG. 1, there is shown a conventional appearing clock including a case 1 and a dial face 2 with hour hand 3, minute hand 4, and second hand 5. From the rear view of the clock, shown in FIG. 2, there can be seen a front support plate 6 and a middle support plate 7 between which is supported a conventional gearing arrangement of a clock mechanism, a portion of which is seen at 7a.

Figure 2:
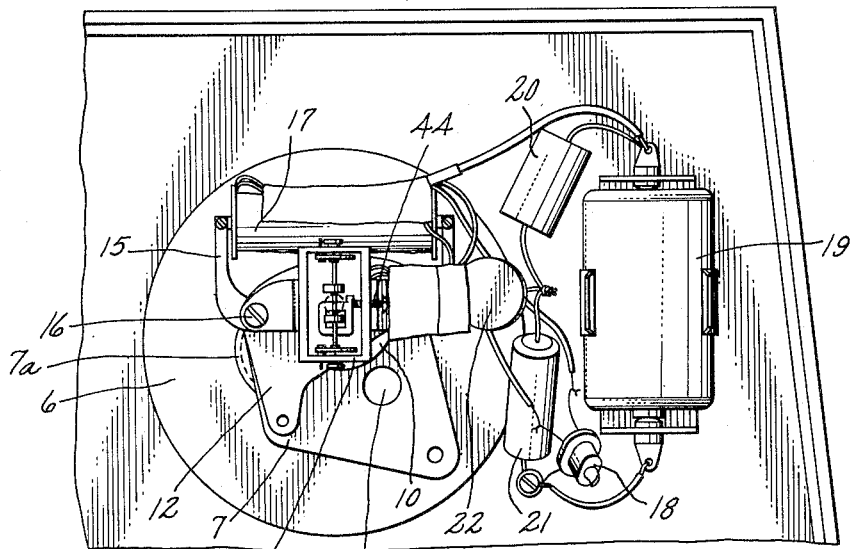
FIG. 2 is a rear elevation, partially cut-away view of the clock of FIG. 1.
Figure 3:
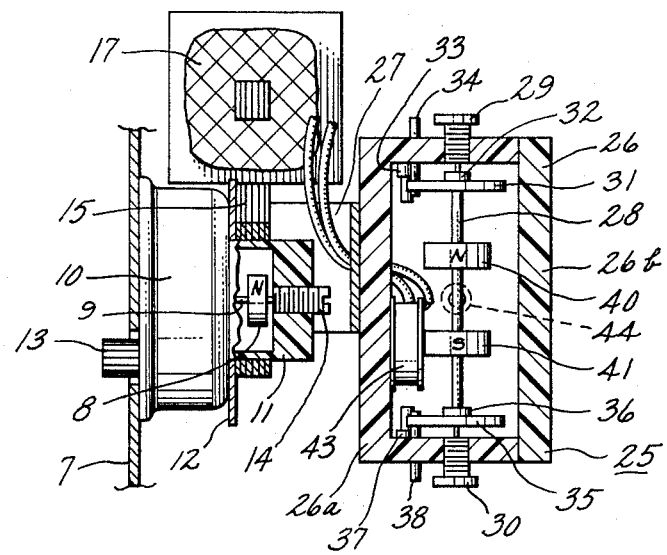
FIG. 3 is a side elevation, partially sectionalized view of the motor oscillator combination of the invention.

Referring to FIGS. 2 and 3, the clock mechanism is to be driven by a permanent magnet motor which includes a permanent magnet rotor 8 mounted on a shaft 9. The rotor is provided with a diametric magnetic axis indicated by N representing a north pole. One end of the shaft 9 is connected directly to a gear reduction unit 10 sealed together with the shaft and rotor within a non-magnetic housing 11. The housing is supported between the middle plate 7 and a rear plate 12. The gear reduction unit 10 has an output drive gear 13 which drives the clock mechanism. The other end of the shaft 9 is supported by a thrust bearing formed within a plug 14 threadably received within the rear wall of the housing 11.

The motor stator 15 includes a plurality of steel plates, secured by a suitable fastener 16 to rear plate 12 and a large field coil or winding 17 shown positioned on the upper portion of the stator. It should be noted that there is a relatively large air-gap between the rotor 8 and stator 15.

The electronic oscillating circuit of the invention includes the motor winding 17, a transistor 18, a battery 19, and capacitors 20, 21 and 22. The size of these components and the manner in which they are connected will be explained in connection with the circuit diagram of FIG. 4. In accordance with the invention, the electronic oscillating circuit is synchronized with the oscillation of a mechanical oscillator shown generally at 25. The mechanical oscillator provides an accurate and adjustable frequency determining device by which the rotational rate of the motor may be controlled. The components of the oscillator are contained in a housing 26 formed of non-magnetic material such as plastic; and if desired, translucent plastic may be employed to permit visual inspection of the oscillator in operation. The housing 26 may be secured to a non-magnetic support member 27 in any suitable manner while the support member is secured by fastener 16 to stator 15 and rear support plate 12.

The oscillating element illustrated within the housing is a shaft 28 rotatably supported between upper bearing 29 and lower bearing 30. The bearings may be given jeweled surfaces to minimize wear and friction losses. Each end of the shaft 28 is provided with a needle point which engages the respective bearings 29 and 30. This arrangement provides a minimum of resistance to oscillation thus minimizing the energy required to drive the oscillator.

On the upper end of the shaft as viewed in FIG. 3 there is provided a conventional hair spring 31 having its inner end fixed to a bushing type member 32 secured to shaft 28. The opposite end of hair spring 31 is slidably received between pins 33 and 34 fixed to housing 26. The opposite end of shaft 28 is similarly provided with a hair spring 35, bushing type member 36, and pins 37 and 38. The hair springs serve to limit the amount of rotation of shaft 28 and to restore the shaft to its original position after it has been rotated.

In accordance with the invention, there is provided a pair of balance wheels 40 and 41 mounted on the oscillator shaft 28. Each of the balance wheels is made of permanently magnetized material with a diametric magnetic axis extending in mutually parallel relationship. Although parallel, the axis of balance wheel 40 as indicated by the letter N is 180° out of phase with the magnetic axis of wheel 41 as indicated by the letter S, as shown in FIG. 3. The balance wheels 40 and 41 are sufficiently close to the permanent magnet motor so that the changing magnetic fields produced by the motor cause the balance wheels to move and impart rotation to the oscillator shaft 28. It has been found that by positioning shaft 28 perpendicular with respect to the motor shaft 9, the maximum effect on the balance wheels is obtained from the field produced by the permanent magnet motor 8.

Since the purpose of the mechanical oscillator is to control the oscillation or rotation rate of the motor, it is necessary to introduce the mechanical oscillator frequency rate into the circuit of the electronic oscillator. For this purpose, there is provided a pickup coil 43 mounted on a wall of oscillator housing 26 and connected to the oscillating circuit. Balance wheel 41 is positioned in inductive relation with pickup coil 43 with the magnetic axis of balance wheel 41 extending in a direction perpendicular to the coil air core axis. With this arrangement, balance wheel 41 induces a signal in pickup coil 43 as the wheel oscillates. This signal controls the oscillation rate of the electronic oscillator as will be hereinafter described.

Since only balance wheel 41 is positioned in inductive relation with pickup coil 43, it will be appreciated that balance wheel 40 is not absolutely essential to form an operational system. The primary reason for utilizing a pair of balance wheels is to offset or cancel the effect of any stray magnetic fields on the operation of the magnetic oscillator, such as the earth's magnetic field for example. Since the magnetic axes of the balance wheels are of opposite polarity, magnetic fields emanating from a remote source have little or no effect on the oscillation rate of the balance wheels in that the forces on the balance wheels are equal and opposite and therefore cancelled.

It is desirable that the oscillation rate of the mechanical oscillator 25 be adjustable. In accordance with an aspect of the invention, there is provided an adjusting screw 44 threadably received within a wall of housing 26 and extending in a direction perpendicular to the oscillator rotational axis 28 between balance wheels 40 and 41. By making the screw of steel or other magnetic material, the screw will attract the magnetic balance wheels to vary the oscillation rate of the oscillator as the screw is moved closer or further away from the balance wheels. Since the screw head is accessible from the exterior of the oscillator housing 26, this provides a very convenient manner in which to magnetically regulate the frequency of oscillation.

Figure 4:
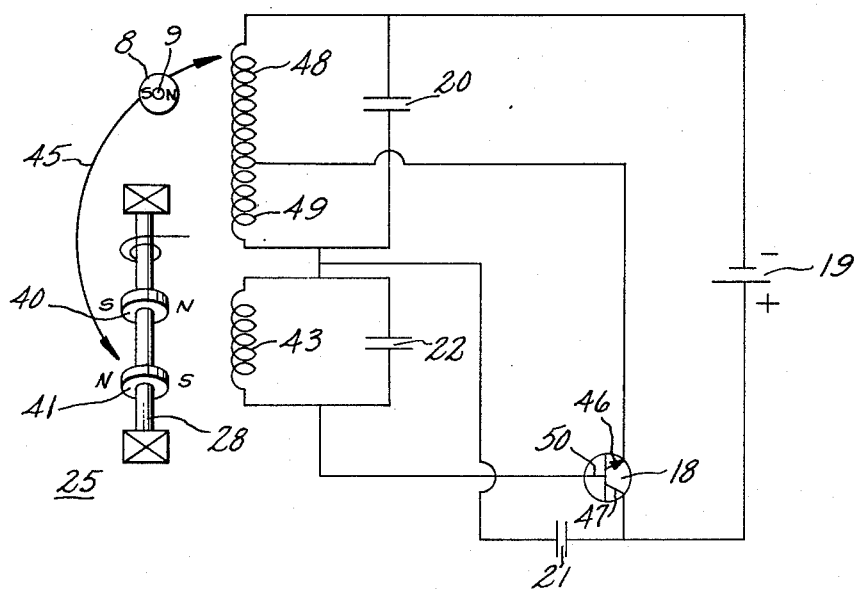
FIG. 4 is a schematic diagram of the motor oscillator circuit of the invention.

Turning now to the schematic diagram of FIG. 4 showing the circuitry of the system, the motor stator 17 and rotor 8 are shown by arrow 45 to be magnetically coupled to balance wheels 40 and 41, and balance wheel 41 is shown in inductive relation to pickup coil 43. It should be understood that the physical arrangement of the components is as shown in FIGS. 2 and 3, whereas the arrangement of FIG. 4 is schematic. The illustrated transistor 18 is of the NPN variety, however a PNP transistor may be employed by reversing the polarity of battery 19. The transistor output circuit includes its emitter 46 and collector 47 serially connected to battery 19 and a first portion 48 of field coil 17. The capacitor 20 is connected in parallel with field winding 17 to form an L.C. tank circuit. The minor portion 49 of winding 17 forms another serially connected circuit with capacitor 20, battery 19, collector 47 and emitter 46. A serially connected transistor input circuit is formed by emitter 46, winding 49 and base 50 of transistor 18. The parallel tank circuit formed by pickup winding 43 and capacitor 22 is also serially connected within this input circuit. The capacitor 21 is connected between the tank circuit and collector 47.

The electrical values of the circuit components should of course be selected to obtain the desired operating characteristics. By way of example, typical values for the system shown are .68 microfarad for capacitor 20 when coupled with a field winding 17 having approximately 10,000 turns of number 37 wire with the tap forming the first and second portions of the winding being situated to provide 8,000 turns for winding portion 48 in the output circuit and 2,000 turns for the winding portion 49 in the input feedback circuit. Pickup coil 43 may include approximately 3,400 turns with its parallel capacitor 22 having a rating of .01 microfarad. The capacitor 22 is not essential to the circuit but is provided to suppress any parasitic high frequency oscillations. Capacitor 21 which is part of the L.C. tank circuit, may be given a value of approximately .25 microfarad. One of the advantages of the system shown is its low power requirements; battery 19 may be a conventional flashlight "D" cell with a 1.5 voltage rating. Since the current requirements for the system are very low, the battery does not have to be frequently replaced, thus making operation of the clock very economical as well as convenient.

*Operation*

The operation of the system may be more clearly understood with a step-by-step description given in connection with FIGS. 5–9. The system before oscillating is biased by a leakage current indicated by arrow 52 flowing from battery 19 to collector 47 to base 50, from the base through pickup coil 43 and motor winding 17 back to the battery. There is also a leakage current indicated by the arrow 53 from the collector to the emitter through coil portion 48 back to the battery. Although the leakage current charges capacitor 20, there is no oscillation at this point; the motor and the balance wheels are in a stable state.

Turning the starting shaft drives the rotor. With this rotation the alternating magnetic field of the moving rotor will cause the balance wheels 40 and 41 of the mechanical oscillator to begin to move against the force of hair springs 31 and 35, FIG. 3. The oscillation of the balance wheels 40 and 41 of the mechanical oscillator caused by the rotation of the rotor 8 can best be understood by reference to FIGURE 10. While oscillation of the magnetic balance wheels 40 and 41 is caused by rotation of the motor rotor 8 at its synchronous speed, it will be assumed for purposes of explaining starting that the initial position of the rotor poles is that indicated by the start axis. With the rotor poles in the start position, the poles of the balance wheels 40 and 41 will be attracted from the indicated zero position to the position indicated by the letter A. This rotation of the balance wheels from the zero position causes energy to be stored in the hair spring 31. As the rotor continues to rotate in a direction indicated by the arrow, thereby reducing the attractive forces between the rotor poles and the balance wheels, the stored energy will cause the balance wheels to rotate back toward the zero position. When the motor rotor has rotated one-quarter of a revolution, the axis of the motor poles is vertical, with the north pole on top. During the same period, the magnetic axis to the balance wheels will have returned to the zero position. As the rotor continues to rotate another one-quarter of a revolution, wherein the rotor poles are reversed with respect to the indicated start axis, the balance wheels continue to rotate in the same direction toward the axis indicated by the letter B. In this position, the hair spring 31 is exerting a torque on the balance wheels tending to return them to the zero position which is equal to the repulsion torque of the rotor poles 8 on the balance wheel poles. As the motor continues to rotate toward the position in which its magnetic axis is vertical, with the north pole on the bottom, the repulsion torque between the balance wheel poles and the rotor poles decreases, whereby the hair spring torque causes the balance wheels to return to the zero position. During the next one quarter of a revolution of the motor rotor, it is returned to the start position, thus making one complete revolution. The rotor again attracts the balance wheels to the position indicated by the letter A.

The movement of balance wheel 41 will generate a voltage in pickup coil 43. The polarities established by the capacitor 20 and the voltage generated in the pickup coil hold the transistor 18 in the "off" or non-conducting state.

As the capacitor current tends to diminish, the polarities of winding 17 change, as shown in FIG. 7, to keep the existing current flowing. The change in polarity of coil 49 and the balance wheel signal generated in the pickup coil provide the proper bias to turn the transistor "on." While the pickup coil 43 is supplying the transistor 18 with "on" current 56, the current 55 flowing through the transistor from collector to emitter charges the capacitor 20. Once charged, the capacitor 20 supplies the "on" current as indicated by arrow 57 in FIG. 8. This causes a large current 58 to flow through the transistor 18 through portion 48 of motor winding 17. This current causes a magnetic field to build up in the motor field which in turn supplies the balance wheels 40 and 41 with the necessary energy to keep them oscillating.

Once the current 57 begins to decrease, the large current 58 through coil 48 begins to decrease and the pickup coil signal starts to go negative. The polarities once more change as shown in FIG. 9 and the transistor is turned "off." The capacitor 20 then becomes fully charged in the opposite polarity of FIGS. 7 and 8 by the coil 48. At the point when the capacitor 20 receives its maximum charge, the current reverses direction, flowing through coil 48, which keeps the transistor in the "off" state returning the circuit to the condition shown in FIG. 6, to complete the cycle.

Starting may be accomplished by manually spinning the rotor by means of manual control 60, shown in FIG. 2. The rotor must be rotated at approximately its synchronous speed so that it will rotate in step with the alternating magnetic fields created by the oscillating tank circuit of the motor coil and associated capacitor. Once in operation, the rotor 8 will assist in oscillating the balance wheels of the mechanical oscillator by means of the changing magnetic fields produced by the moving rotor.

The magnetic energy transmitted to the mechanical oscillator and the action of the hair springs 31 and 35 will cause the mechanical oscillator to oscillate at its natural resonant frequency. This frequency is selected to be close to the oscillation frequency of the transistor oscillator circuit. Accordingly, the rate of oscillation of the oscillating circuit will be determined by the accurate oscillating frequency of the mechanical oscillator.

Thus it will be appreciated that the mechanical oscillator and electronic oscillating circuit combination described provides a relatively simple and compact battery powered device for driving a clock mechanism at a controlled rate. It will be obvious to those skilled in the art that various changes and modifications may be made without departing from the invention in its broader aspects. Accordingly, it is intended in the appended claims to cover all such changes and modifications which fall within the true spirit and scope of the invention.

What we claim is:

1. The combination in a clock of a motor having a permanent magnet rotor for driving the clock, a direct current energy source, electronic means connected to said energy source and said motor for converting the direct current into an oscillating power supply for driving said motor, a pickup coil connected to said electronic means, a mechanical oscillator having a relatively accurate natural frequency of oscillation close to the frequency of oscillation of said power supply, permanent magnet means positioned on said mechanical oscillator in inductive relation with said pickup coil, said mechanical oscillator being arranged to supply signals to said electronic means to cause said power supply to oscillate with the frequency of oscillation of said mechanical oscillator whereby said clock is driven at a horological rate.

2. The combination in a clock of a motor having a permanent magnet rotor for driving the clock, a direct current energy source, a transistor oscillator circuit connected to said energy source and said motor for converting the direct current into an oscillating power supply for driving said motor, a pickup coil connected to said transistor oscillator circuit, a mechanical oscillator having a relatively accurate natural frequency of oscillation close to the frequency of oscillation of said power supply, permanet magnet means positioned on said mechanical oscillator in inductive relation with said pickup coil, said mechanical oscillator supplying signals to said transistor circuit to synchronize the frequency of oscillation of said power supply with that of the mechanical oscillator so that said clock is driven at an accurately controllable rate.

3. The combination in a clock of permanent magnet rotor means for actuating the clock, stator means positioned in flux inducing relation with the rotor, a continuous winding wound on said stator, a source of electrical energy, electronic oscillating means positioned between said winding and said source of electrical energy for supplying oscillating sinusoidal power to the stator winding, a pickup coil connected to said electronic oscillating means, a mechanical oscillator having a relatively accurate natural frequency of oscillation close to the frequency of oscillation of said electronic oscillator, permanent magnet means positioned on said mechanical oscillator in flux inducing relation with said pickup coil, said mechanical oscillator being arranged to supply signals to said electronic oscillating means to synchronize the electronic oscillating means in accordance with the frequency of oscillation of said mechanical oscillator whereby said clock is driven at a horological rate.

4. The combination in a clock of permanent magnet rotor means for actuating the clock, stator means positioned in flux inducing relation with the rotor, a continuous stator winding having a first portion and a second portion, a battery, an oscillator circuit including a transistor having an emitter, a collector and a base, said emitter and collector being serially connected to said first winding portion and said battery, said base and emitter being serially connected to said second winding portion, a pickup coil serially connected between said base and said second winding portion, a mechanical oscillator having a relatively accurate natural frequency of oscillation close to the frequency of said oscillator circuit, permanent magnet means positioned on said mechanical oscillator in flux inducing relation with said pickup coil, so that the oscillation of said magnet means produces signals which are transmitted through the pickup coil to the transistor to impress the oscillation frequency of the mechanical oscillator onto said transistor whereby said rotor means is furnished an oscillating power supply to drive the clock at a horological rate.

5. In a clock, the combination of a motor having a permanent magnet rotor for driving a clock, a direct current energy source, electronic oscillating means connected to said energy source and said motor for converting said direct current into an oscillating power supply for driving said motor, a mechanical oscillator having a relatively accurate natural frequency of oscillation close to the frequency of oscillation of said electronic oscillator, permanent magnet means positioned on said mechanical oscillator, said permanent magnet means being positioned in inductive relation with respect to said motor so that the changing magnetic fields produced by said permanent magnet motor cause said mechanical oscillator to oscillate, a pickup coil connected to said electronic means and positioned in flux inducing relation with said permanent magnet means so that the mechanical oscillator supplies signals to said electronic means to synchronize the oscillation of said power supply in accordance with the frequency of oscillation of said mechanical oscillator whereby said clock is driven at an accurate rate.

6. In a clock, the combination of a motor having a permanent magnet rotor for actuating the clock and a stator positioned in flux inducing relation with the rotor, a direct current energy source, an electronic oscillating circuit connected to said energy source and said motor for converting the direct current into an oscillating power supply for driving the rotor, a mechanical oscillator having a relativeely accurate natural frequency of oscillation, a permanent magnet means positioned on said mechanical oscillator, said oscillator and permanent magnet means being positioned in flux inducing relation with respect to said motor so that the changing magnetic fields produced by said motor provide the moving force for said mechanical oscillator, a pickup coil connected to said circuit, said coil being positioned in inductive relation with said permanent magnet means so that the oscillation of said magnet means supplies signals to said circuit to thereby synchronize natural frequency of the motor to the frequency of oscillation of said mechanical oscillator.

7. The combination in a clock of a permanent magnet rotor for driving a clock, a stator positioned in flux inducing relation to said rotor, a continuous winding wound on said stator, a source of electrical energy, electronic oscillating means connected to said winding and said source of electrical energy for supplying oscillating sinusoidal power to the winding, a pickup coil connected to said electronic oscillating means, a torsional oscillator having an oscillating axis which extends in a direction perpendicular to the rotational axis of said rotor, permanent magnet means positioned on said torsional oscillator in flux inducing relation with said pickup coil, said permanent magnet means also being positioned in flux inducing relation with said rotor whereby the changing magnetic fields produced by said rotor cause said torsional oscillator to oscillate, said torsional oscillator being arranged to supply signals through said pickup coil to said electronic oscillating means to synchrnoize the electronic oscillating means in accordance with the frequency of oscillation of said torsional oscillator whereby said clock is driven at a horological rate.

8. In a clock, the combination of a motor having a permanent magnet rotor for driving the clock, a continuous motor winding having a first portion and a second portion, a battery, a transistor having an emitter, a collector and a base, said emitter and collector being serially connected to said first winding portion and said battery, said base and emitter being serially connected to said second winding portion, a capacitor connected in parallel with said stator winding, a pickup coil serially connected to said base said second winding portion and said emitter, a second capacitor serially connected to said second winding portion and said collector and emitter, a mechanical oscillator, permanent magnet means mounted on said mechanical oscillator in flux inducing relation with said pickup coil so that the rotor is furnished an oscillating power supply synchronized with said mechanical oscillator.

9. In a clock, the combination of a permanent magnet rotor for actuating the clock, a stator positioned in flux inducing relation with the rotor, a continuous stator winding having a first portion and a second portion, a capacitor connected in parallel with said stator winding so that the combination of the winding and the capacitor form a tank circuit for an electronic oscillator, a battery, a transistor having its output circuit serially connected to said battery and said first winding portion, a pickup coil, said transistor having its input circuit serially connected to said second winding portion and said pickup coil, a mechanical oscillator having a relatively accurate natural frequency of oscillation close to the frequency of said oscillator circuit, permanent magnet means positioned on said mechanical oscillator in inductive relation with said pickup coil so that the oscillation of said magnet means synchronizes the mechanical oscillation rate with that of the electronic oscillator whereby said rotor is driven at a horological rate.

10. The combination in a clock of a permanent magnet motor for driving the clock, a direct current source, electronic means connected to said energy source and said motor for converting the direct current into an oscillating power supply for driving said motor, a pickup coil connected to said electronic means, a balance wheel mechanical oscillating assembly positioned adjacent to said motor, said assembly including a non-magnetic support, a shaft rotatably mounted in said support, a hair spring secured to and surrounding said shaft and secured to said support, a permanent magnet balance wheel mounted on said shaft in inductive relation with said motor and with said pickup coil, said balance wheel being caused to oscillate by said motor and said hair spring to thereby produce signals through said pickup coil to said electronic means to synchronize the electronic oscillating means in accordance with the frequency of oscillation of said balance wheel whereby said clock is driven at a horological rate.

References Cited by the Examiner

UNITED STATES PATENTS 2,994,023   7/61   Devol.

FOREIGN PATENTS 327,359   3/58   Switzerland.

ORIS L. RADER, *Primary Examiner.*

MILTON O. HIRSHFIELD, *Examiner.*